United States Patent [19]

Goguel

[11] 4,235,198
[45] Nov. 25, 1980

[54] IMMERSABLE DEVICE FOR A PROGRESSIVE DISTRIBUTION IN PARTICULAR FOR FEEDING FISH

[76] Inventor: Olivier P. Goguel, 80 rue Michel Ange Str., 75016 Paris, France

[21] Appl. No.: 917,551

[22] Filed: Jun. 21, 1978

[30] Foreign Application Priority Data

Jun. 22, 1977 [FR] France ............................ 77 19094

[51] Int. Cl.³ ...................... A01K 61/02; A01K 97/02
[52] U.S. Cl. .................................. 119/51 R; 119/3; 43/44.99
[58] Field of Search ............... 119/51 R, 51.11, 56 R, 119/3; 43/44.99

[56] References Cited

U.S. PATENT DOCUMENTS

| | | | |
|---|---|---|---|
| 695,921 | 3/1902 | Forster | 43/44.99 |
| 3,163,959 | 1/1965 | Hollar | 43/44.99 |
| 3,587,530 | 6/1971 | Blair | 119/51.11 |
| 3,742,913 | 7/1973 | Crippen | 119/51.11 |

*Primary Examiner*—Hugh R. Chamblee
*Attorney, Agent, or Firm*—O'Brien & Marks

[57] ABSTRACT

The device comprises an envelope for containing the product to be distributed. A distribution orifice is provided in the envelope and a closing member, which is mounted to be movable relative to this orifice, is connected to a device for actuating the closing member.

The invention is particularly advantageous in the use of the device in the feeding of fish.

14 Claims, 2 Drawing Figures

IMMERSABLE DEVICE FOR A PROGRESSIVE DISTRIBUTION IN PARTICULAR FOR FEEDING FISH

The present invention relates to an immersable device for a progressive distribution intended to supply in a regular manner within a liquid a product that this device contains.

Such a device has a particularly advantageous application in the distribution of food intended to be absorbed in suspension by fish, whether the latter be in free water or within a cage which is lowered to the bottom of the water and has closing means allowing the passage of this device. Such a cage is, for example, described in applicant's French Pat. application No. 76 08 667.

According to the invention, there is provided an immersable device for effecting a progressive distribution, in particular for feeding fish, which comprises an envelope for containing the product to be distributed and having a distribution orifice, and closing means which is mounted to be movable relative to said orifice and connected to means for actuating said closing means.

In order to ensure that the surrounding water cannot come into contact with the product contained in the envelope and possibly prematurely destroy the characteristic properties of this product which are essential to its utilization, the distribution orifice may be advantageously arranged in the lower part of the envelope and the device may further comprise an air chamber which is located below said orifice, extends downwardly and is open at its lower end. In order to ensure that no water rises in the product through the air chamber, means are preferably provided in the device for pressurizing the whole of the atmosphere inside the envelope and the whole of the atmosphere of the air chamber. In a specific embodiment of the invention, the pressurization is produced by means of a second air chamber disposed inside the envelope and above the product to be distributed, and a supply of fluid under pressure connected to one of the air chambers.

In a particularly advantageously manner, for the purpose of ensuring the strength and durability of the device, the envelope may be formed by a flexible envelope disposed in a rigid enclosure. In this case, this rigid enclosure may preferably comprise two compartments disposed one above the other, one of the compartments containing the flexible envelope and the other compartment the closing means and the means for actuating the closing means, said second compartment having an opening which is disposed in the vicinity of the distribution orifice and through which the closing means extends for coming into facing relation to said orifice, and the enclosure may also preferably comprise, in its lower part, a third compartment which is disposed below both the second compartment and the distribution orifice, said third compartment defining said first air chamber.

The purpose of the ensuing description, given by way of a nonlimitative example with reference to the accompanying drawings, is merely to explain how the invention can be carried out.

Figure 1:
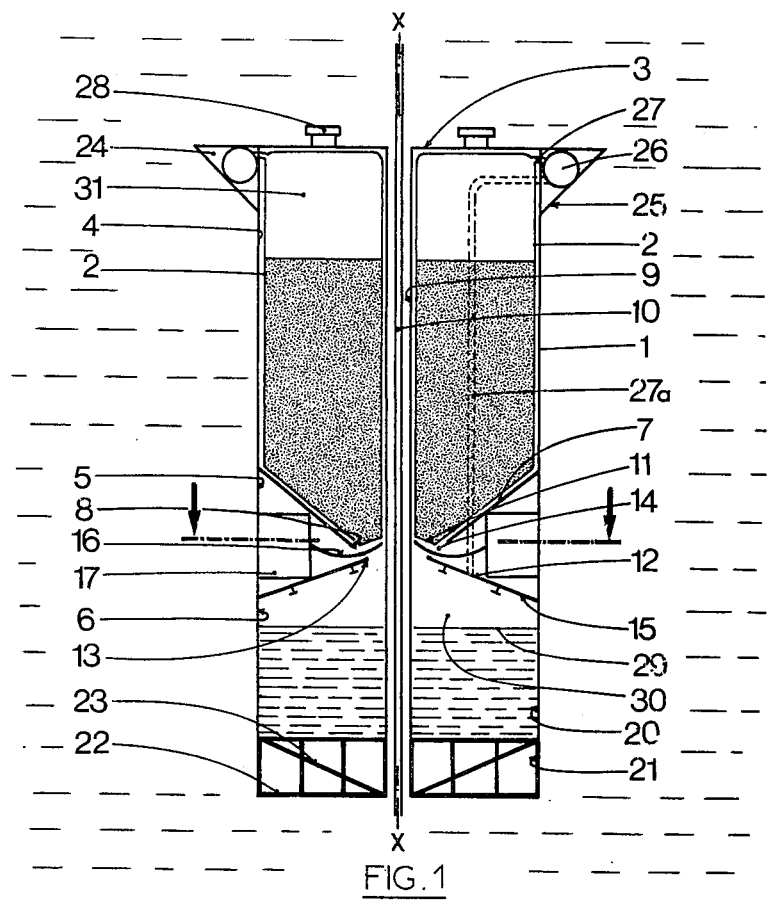
FIG. 1 is an elevational and diametral sectional view of the device according to a first embodiment of the invention.
Figure 2:
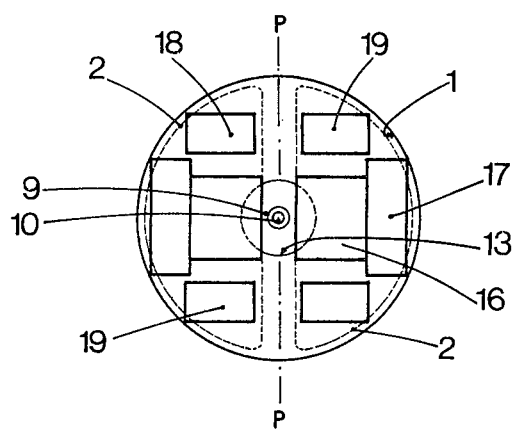
FIG. 2 is a sectional view taken on the heavy long and short dashed line of FIG. 1.

The device illustrated in FIGS. 1 and 2 mainly comprises a rigid enclosure 1 in which are disposed two flexible envelopes 2 intended to contain a product to be distributed, such as a food powder for fish.

The rigid enclosure 1 is cylindrical, has a vertical axis X—X and is made from a rigid material, such as metal. This enclosure has a relatively large axial dimension, for example on the order of magnitude of three or four times its diameter. This enclosure is closed in its upper part by a planar end wall 3 and open at its lower end.

This enclosure is vertically divided into three compartments, namely an upper compartment 4 in which the flexible envelopes are disposed, an intermediate compartment 5 for receiving closing means and means for actuating the latter, and a lower compartment 6 defining an air chamber. The compartment 4 is separated from the compartment 5 by an end wall formed by a downwardly convergent frustoconical wall 7 the base of which is located approximately midway of the height of the enclosure, whereas the circular small base of this frustoconical wall 7 defines two semi-circular orifices 8. The latter are reduced in the middle thereof owing to the passage of a vertical tube 9 which extends throughout the height of the enclosure along the axis X—X thereof. The tube 9 serves to guide the device along a vertical cable 10, as will be described hereinafter. The compartment 2, thus defined by the wall 7 which extends downwardly at approximately 45°, contains two envelopes 2 of a flexible material, such as, for example, rubber or a synthetic material the shape of which is approximately semicylindrical in respect of each envelope, the assembled envelopes exactly filling the volume of this compartment 4. The lower parts of these envelopes have distribution orifices 11 which are disposed at the level of the semi-circular orifices 8 of the wall 7. The envelopes 2 are in contact with each other in a diametral plane P—P (FIG. 2).

The intermediate compartment 5 is defined, on one hand, by the wall 7 and, on the other hand, by a second end wall 12 formed by an upwardly convergent frustoconical wall whose inclination is at approximately 30° to the vertical and whose small base defines a circular opening 13 which has a diameter slightly less than the diameter of the opening 8 and is disposed at a lower level than the level of the opening 8 so as to define therewith an annular passageway 14 located below the orifices 11. This end wall 12 comprises detachable panels secured by means 15 the dismantling of which gives access to the compartment through the bottom of the enclosure for the purpose of maintenance of the elements contained in this compartment.

The closing means mentioned before each comprise a flap 16 in the shape of a quarter of a cylinder disposed in the radially innermost part of the compartment 5 with their axis disposed horizontally and parallel to the plane P—P and their concavity facing upwardly so that their inner edge extends through the passageway 14 and is placed, in respect of each edge, below one of the distribution orifices 11.

The means for actuating these closing means comprise driving means 17 on the output members of which said closing means are fixed so as to control the displacement of the latter in such manner that they either mask the orifices 11 or unmask or open the latter. These driving means 17 are preferably formed by air motors but may also be of some other type. They are disposed on each side of the plane P—P and contained in a diametral plane perpendicular to the latter so as to leave free on each side spaces in which are disposed, on one hand, two power supplies 18, for example electrical or pneumatic power, and, on the other hand, two timing units 19. These power supplies 18 and timing units 19 are connected to the motors 17.

The lower compartment 6, which extends approximately on one quarter of the height of the enclosure, is defined by the end wall 12 and the lower part of the enclosure or skirt 20, the latter being apertured in its lower end, for example in the bottom quarter thereof. These apertures are produced, for example, by the arrangement of vertical parallel bars 21 throughout the periphery of the enclosure, these bars being interconnected by a lower ring which is stiffened by a horizontal cross-shaped structure 22 and struts 23 located in radial planes.

This enclosure is completed in its upper part by an annular caisson 24 which has a triangular cross-sectional shape and surrounds this upper part of the enclosure so that one of its sides is flush with the planar end wall 3 of the enclosure whereas another side 25 of the caisson has a downwardly convergent frustoconical shape. This caisson contains compressed air cylinders or other supplies of compressed air 26 which are, for example, at a pressure of 40 kg, these cylinders being connected by pipes 27 to the upper part of the envelopes 2. By way of a modification, the cylinders may be connected by pipes 27a to the upper part of the lower compartment 6'. Plugs 28 are provided on the planar end wall 3 to allow the filling of these envelopes 2.

The device just described is employed in the following manner:

It is first filled on the surface, the product to be distributed, for example a food powder for fish, being introduced in the two flexible envelopes 2 by way of the plugs 28. The enclosure is then lowered into the water by sliding the tube 9 along the cable 10, the latter being, for example, held taut between a float on the surface and anchoring or ballast means disposed at depth. When it reaches the end of its downward travel, the device is in condition for distributing the product it contains.

For this purpose, the motors 17, supplied with power from the power supplies 18, are actuated in a regular manner by means of the timing units 19 so that the closing means 16 cyclically unmask the distribution orifices 11 and thereby allow each time a certain amount of product to pass through the passage 14 into the compartment 6. In the latter, the surrounding water rises up to a certain level 29 below the wall 12 and thereby traps between this water level and the compartment 6 a certain volume of air which forms an air chamber 30.

The product which escapes through the passage 14 then passes through this air chamber 30 and is put in suspension in the column of water contained in the skirt 20 and finally escapes from the latter by way of the apertured part 21 or the lower opening of the enclosure. This product in this way reaches its utilization state, for example for absorption by the fish in the case of a food product. The rate at which the closing means open, and consequently the rate of distribution, is determined by the timing units 19 and it may be, for example, arranged to have 1 to 20 openings per day. The discharge of the product at the lower end of the envelopes is facilitated by the presence of the air chamber 31 which is progressively created above this product and is supplied with air by the air cylinders 26. The latter also produce in this chamber 31 a slight overpressure, on the order of a few hundred grams, which enables the water level 29 in the skirt to be maintained below the wall 12. In the modified construction employing the pipe 27a, this overpressure is created in the lower air chamber 30 itself and also performs the same function in this case. The presence of this overpressure in one of the two chambers 30 or 31 is essential in that it avoids need for an excessive size of the skirt 20 to obtain the desired result. By way of a modification, it could be arranged to create this overpressure, not permanently by means of the air cylinders 26, but solely when filling the device on the surface by means of an inflation of the whole of the enclosure at a given pressure, for example on the order of three bars. In this case the air cylinders 26 could be none the less provided to serve as a power supply for the means actuating the closing means. Note that the intermediate compartment 5 is arranged to be airtight, for example at a pressure of three bars.

Figure 4:
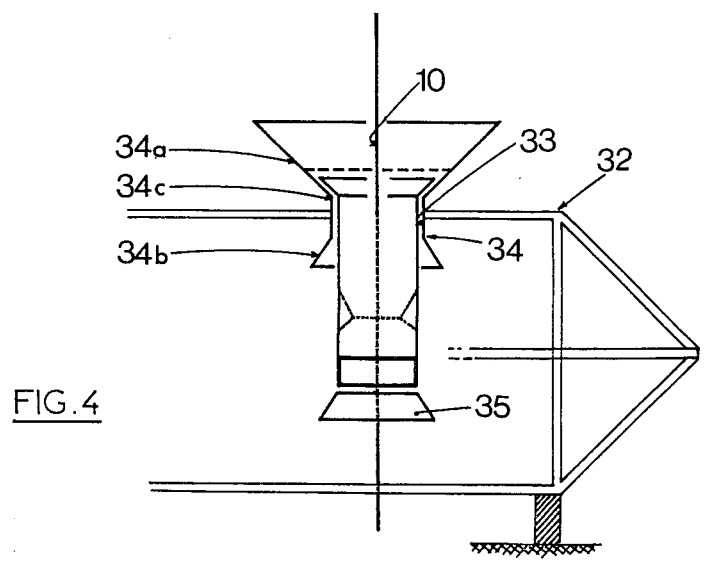
FIG. 4 illustrates the use of the device on a fish breeding cage.

When using the device for feeding fish, although this device may be employed in free water as shown simply in FIGS. 1 and 2, it may also be employed in combination with a fish breeding cage 32, such as for example that disclosed in French Pat. No. b 76 08 667. As shown in FIG. 4, this cage has in its upper part an opening 33 which comprises a double seat 34 formed by an upper frustoconical part 34a and a lower frustoconical part 34b interconnected by a cylindrical centre part 34c toward which the other two parts converge and whose inside diameter is slightly larger than the diameter of the enclosure 1 of the feeding device.

The cable 10 is located on the axis of the opening 33 and the double seat 34 and is fixed at its lower end to the bottom of the cage. Also slidably mounted on this cable 10 below the device 1 is a frustoconical closing means 35 having a positive buoyancy.

The device is then used in the following manner:

When the device is on the surface for the purpose of filling it, the opening of the cage is closed by the closing means 35 which bears against the lower seat 34b. When the device is lowered along the cable 10, it then urges this closing means 35 downwardly until the closing means, formed by the lower frustoconical wall 25 of the caisson 24, is applied against the upper seat 34a.

Thus the cage is permanently closed, either by the closing means 35 or by the caisson 24, so that the fish within the cage cannot escape.

Figure 3:
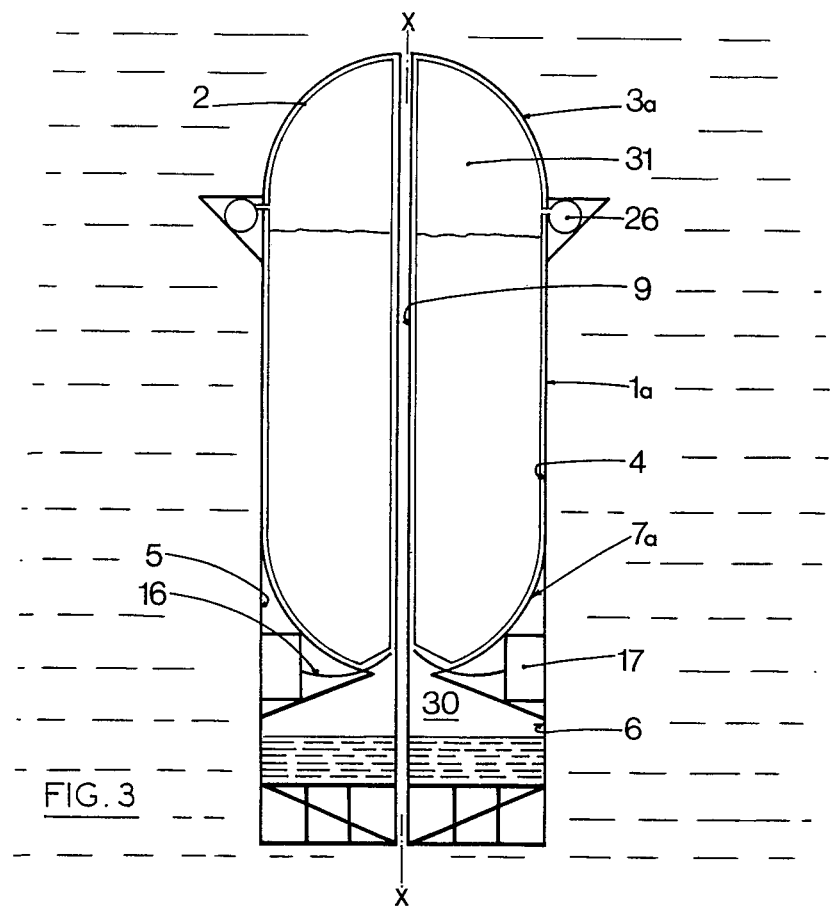
FIG. 3 is a view similar to FIG. 1 of a second embodiment of the invention.

The device illustrated in FIG. 3 as a modification differs from that shown in FIGS. 1 and 2 only in that the enclosure 1a is closed at its upper end not by a planar end wall 3, but by a semi-spherical end wall 3a, whereas the upper compartment 4 is defined at its lower end not by a frustoconical wall 7, but by a semispherical wall 7a, the concavities of the two end walls facing inwardly of the enclosure. Apart from this sole difference, the device has an identical structure and operates in the same way as the device shown in FIGS. 1, 2 and 4.

This structure enables the internal pressure to be increased, for example to 9 bars, or enables the device to be lowered to a greater depth.

It must be understood that the invention is not intended to be limited to the embodiments described hereinbefore and other forms and other embodiments may be envisaged without departing from the scope of the invention as defined in the accompanying claims.

I claim:

1. An immersible progressive distribution device, particularly for feeding fish, comprising
a rigid enclosure including a peripheral vertical wall defining compartment means open at the bottom, and a supporting wall extending inwardly from the peripheral wall and having an opening;
said compartment means including a lower compartment below the supporting wall;
an envelope supported on said supporting wall and having an inside volume to contain a product to be distributed;
said envelope being provided with an opening at the lower end thereof and aligned with the opening of the supporting wall;
said opening of the supporting wall and said opening of the envelope defining a distribution orifice for the product,
closing means supported by the enclosure opposite the distribution orifice for blocking the orifice;
means for actuating the closing means; and
said peripheral vertical wall extending a sufficient distance below the supporting wall so that an air chamber is formed below the distribution orifice in the lower compartment to prevent water from contacting the product in the envelope when the device is immersed.

2. A device as claimed in claim 1 wherein the rigid enclosure is cylindrical and has a vertical axis.

3. A device as claimed in claim 1 wherein the lower compartment has an apertured lower region.

4. A device as claimed in claim 1 wherein said actuating means includes driving means connected to the closing means, a power supply, and timing means for periodically connecting the power supply to the driving means to operate said closing means.

5. A device as claimed in claim 1, wherein the compartment means includes an upper compartment above the supporting wall, and the envelope is flexible and disposed in the upper compartment.

6. A device as claimed in claim 5 wherein the compartment means also includes an intermediate compartment disposed between the upper compartment and the lower compartment, said intermediate compartment containing the closing means and the actuating means, and said intermediate compartment having an opening which is located in the vicinity of the distribution orifice and through which opening the closing means passes for blocking said orifice.

7. A device as claimed in claim 6 wherein the rigid enclosure has an apertured lower end.

8. A device as claimed in claim 6 wherein the supporting wall is a frustoconical wall with its small end extending downward and having said opening of the supporting wall formed therein.

9. A device as claimed in claim 8 wherein the intermediate compartment is defined at the upper end thereof by the supporting frustoconical wall and, at the lower end thereof, by a frustoconical wall, the two frustoconical walls defining therebetween a distribution passage communicating with said distribution orifice.

10. A device as claimed in claim 6 comprising means defining a vertical passage which extends axially through the compartments, and a guide cable which extends freely through the passage for moving the device along the guide cable.

11. A device as claimed in claim 10, in combination with a cage having an upper opening and a frustoconical seat surrounding the cage opening, the device further comprising a caisson surrounding and connected to an upper part of the enclosure, and the caisson having a frustoconical lower wall for application against said seat.

12. A device as claimed in claim 1, further comprising means for applying excess pressure connected to the air chamber of said lower compartment.

13. A device as claimed in claim 12 wherein the means for applying excess pressure comprise a reserve of fluid under pressure connected to said inside air chamber.

14. A device as claimed in claim 12, further comprising second means for applying excess pressure connected to the inside volume of said envelope.

* * * * *